United States Patent [19]
Uno

[11] Patent Number: 5,476,361
[45] Date of Patent: Dec. 19, 1995

[54] DEVICE FOR PILING BUNDLES OF SHEETS

[76] Inventor: Tadao Uno, 1-84, Matsugaoka 1-chome, Chigasaki-shi, Kanagawa-ken, Japan

[21] Appl. No.: 169,981

[22] Filed: Dec. 16, 1993

Related U.S. Application Data

[62] Division of Ser. No. 991,967, Dec. 17, 1992, abandoned.

[30] Foreign Application Priority Data

Dec. 26, 1991 [JP] Japan ................... 3-359652

[51] Int. Cl.⁶ ............................................. B65G 57/06
[52] U.S. Cl. .................. 414/790.3; 198/431; 414/794.2; 414/794.7; 414/926
[58] Field of Search ................................ 198/418.1, 431, 198/436, 457, 468.1; 414/790.3, 791.1, 794.2, 794.7, 926, 790.9

[56] References Cited

U.S. PATENT DOCUMENTS

| | | |
|---|---|---|
| 2,769,378 | 11/1956 | Jochem . |
| 3,054,516 | 9/1962 | Joa . |
| 4,249,844 | 2/1981 | Lampe et al. . |
| 4,944,138 | 7/1990 | Aiuola et al. ............................ 53/540 |

*Primary Examiner*—Michael S. Huppert
*Assistant Examiner*—Janice L. Krizek
*Attorney, Agent, or Firm*—Wenderoth, Lind & Ponack

[57] ABSTRACT

A plurality of sheet-bundle piling lanes are disposed in perpendicular relation with respect to a common sheet-bundle feed lane for gradually feeding sheet-bundles. At a communicating portion between the sheet-bundle feed lane and each sheet-bundle piling lane, a sheet-bundle take-in lever, for taking the sheet-bundles from the former lane to the latter lane, is disposed. Blocks of bundles of sheets that are piled up are formed at each sheet-bundle piling lane.

2 Claims, 5 Drawing Sheets

DEVICE FOR PILING BUNDLES OF SHEETS

This application is a Rule 60 divisional of application Ser. No. 07/991,967 filed Dec. 17, 1992, now abandoned, and refiled as continuing application Ser. No, 08/274,364.

BACKGROUND OF THE INVENTION

1. [Field of the Invention]

This invention relates to a device for piling or stacking bundles of sheets that is adapted to pile up, for example, 10 bundles of sheets which are stacked up in a serial order as, for example, from 1 to 1000, as in, for example, banknotes, lottery tickets and, post cards, each bundle consisting of a small number such as, for example, 100 sheets bearing serial numbers, for example, of from 1 to 100, from 101 to 200 and so on, in order to form blocks of piled bundles of sheets.

2. [Brief Description of the Prior Art]

In a conventional device for piling bundles of sheets of the type mentioned above, an intermittent rotary drum, with a group of pockets for receiving the sheet blocks K, which are arranged in a circular pattern in a plan view, is employed. The sheet-bundles are inserted into the pocket group formed on the intermittent rotary drum in a serial order, and then the sheet-bundles in the pockets on the rotary drum are gradually taken out so as to be piled up in serial order.

The above-mentioned conventional device requires an unreasonable amount of work, such as work for inserting the sheet-bundles into the pockets on the rotating drum in serial order and then gradually taking them out so as to be piled up. Moreover, it takes much time and labor to change the position dividing each pocket, or else it is otherwise required to prepare a spare or extra drum having a different dividing position, the preparation of such a spare or extra drum naturally also requires a space for storage. This is not only inefficient but also uneconomical. In particular, it is the actual situation that the formation of piled blocks, which can meet with increased printing speeds, is very difficult.

SUMMARY OF THE PRESENT INVENTION

It is therefore an object of the present invention to provide a device for piling sheet blocks in which the work forming piled blocks by stacking a predetermined number of sheet-blocks, such as the above-mentioned sheet-bundles, can be effected easily, efficiently and economically.

Another object of the present invention is to provide a device for piling three-dimensional sheet blocks in which a large number of sheet-blocks can be formed in an extremely limited space.

To achieve the above objects, there is essentially provided a device for piling bundles of sheets comprising a sheet-bundle feed lane adapted to transfer a plurality of sheet-bundles, each formed of a number of sheets piled up at predetermined spaces, a plurality of sheet-bundle piling lanes disposed in perpendicular relation with the feed lane and adapted to pile a predetermined number of the sheet-bundles in a serial order, and a plurality of sheet-bundle take-in mechanisms, each mechanism being disposed at a communicating portion between the sheet-bundle feed lane and each of the sheet-bundle piling lanes and adapted to take the bundles of sheets, which are being transferred by the sheet-bundle feed lane, onto the sheet-bundle piling lanes.

From another aspect of the present invention, there is also provided, in order to achieve the above objects, a device for piling bundles of sheets in which the sheet-bundle piling lane is of a two-stage structure. A sheet-bundle pooling table for orderly pooling the sheet-bundles is disposed at an upper-stage thereof and, a sheet-bundle block pooling table for piling a predetermined number of the sheet-bundles is disposed at a lower-stage thereof. The upper sheet-bundle pooling table is able to be opened and closed so that the sheet-bundles carried thereon are permitted to be dropped. The sheet-bundles thus dropped are piled on the lower-stage sheet-bundle block pooling table one after another until they reach a predetermined number of sheet-bundles.

Owing to the above-mentioned construction, the sheet-bundles, each composed of a plurality of sheets such as, for example, banknotes, piled in a serial order, are consecutively transferred by the sheet-bundle feed lane, group by group, bearing the identical serial numbers. The sheet-bundles, which are being transferred are intermittently taken into each sheet-bundle piling lane in the order of the serial numbers by each take-in mechanism. As a result, there can be formed, simultaneously and as one group, a plurality of blocks of sheet-bundles piled in the serial order in the sheet-bundle piling lanes, which lanes are arranged in parallel relation.

According to the present invention, by designing the sheet-bundle piling lanes in the above-mentioned two-stage structure, the sheet-bundles taken onto the sheet-bundle piling lanes from the sheet-bundle feed lane by the take-in mechanism are temporarily carried on the sheet-bundle pooling tables of the upper-stage sheet-bundle pooling mechanism by means of the sheet-bundle take-in mechanism. Thereafter, the sheet-bundle pooling tables are opened, so that the sheet-bundles are permitted to drop onto the sheet-bundle block pooling tables disposed under there so as to be piled on the sheet-bundle block pooling tables. As a result, the blocks of sheet-bundles piled in serial order can be formed, and the blocks thus formed are discharged to the following process by a discharging mechanism.

DETAILED DESCRIPTION OF THE EMBODIMENT

The accompanying drawings show one embodiment of a device for piling bundles of sheets, adapted to pile, for example, 10 bundles of sheets which are stacked up in a serial order as in, for example, banknotes, lottery tickets, post cards, each bundle consisting of, for example, 100 sheets, in order to form a block of piled bundles of sheets. The expression "a serial order" used herein refers to the state of those sheets which have a sequential order to be piled up from the first-rank number to the last-rank number, and should not be limited to those sheets which bear specific numerical figures, or the like.

Figure 1:
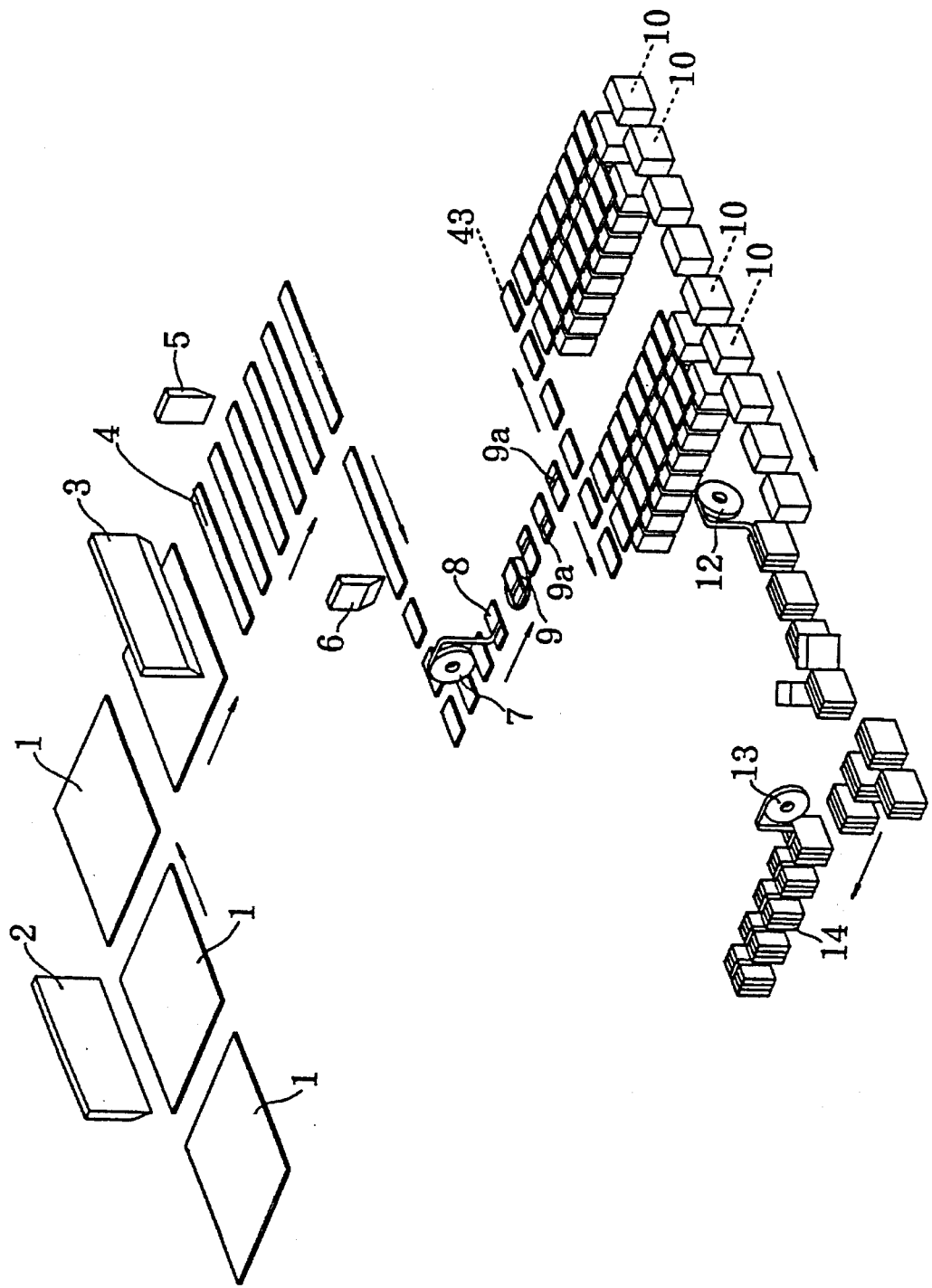
FIG. 1 is a perspective view explaining a system for forming blocks of piled sheet-bundles from large-sized sheet blocks according to the present invention.

FIG. 1 is an explanatory view showing a process for forming blocks of piled bundles of sheets from blocks of large-sized sheets in order to clarify the basic concept of the present invention. In FIG. 1, the numeral 1 denotes large-sized sheets. These large-sized sheets 1 are piled up, for example, 100 per unit in a serial order (for example, 1 to 100, or 101 to 200) to form large-sized sheet blocks 1'.

The large-sized sheets 1 are subjected to surface treatment, not shown, both in both vertical and horizontal rows. In order to simultaneously form a plurality of blocks of piled bundles of sheets bearing serial numbers of, for example, 1 to 1000, by piling up 10 bundles of sheets, 100 large-sized sheets 1 are piled up to form one block 1' of sheets. Each horizontal row has a plurality of printing surfaces. Each printing surface of a first large-sized sheet-block bears serial numbers of from, for example, 1 to 100 in the piling direction. Each printing surface of a second large-sized sheet block bears serial numbers of from, for example, 101 to 200, and in a like manner, each printing surface of the last large-sized sheet block bears serial numbers of from, for example, 901 to 1000.

The block 1' thus obtained by piling the large-sized sheets 1 one upon another is first trimmed by a cutter 2 in a trimming process. The block 1' formed of the large-sized sheets 1 flatly piled and trimmed, is cut by a cutter 3, for example, in a horizontal row cutting process in order to form strips 4 of a row unit, gradually from the frontmost row to the last row for each horizontal row.

The row unit of the strips 4 thus piled up in the identical serial numbers and thus cut are trimmed by a cutter 5, for example, in a trimming process. The row unit of the strips 4 thus trimmed are then cut at each printing surface of the horizontal row thereof by a cutter 6 in a vertical row cutting process. The resultant strips 4 are bundled in a banding process by a banding device 7 to form a number of sheet-bundles 8, each consisting of a unit of 100 sheets bearing consecutive serial numbers.

A banding portion of each of the bundles of 8 sheets is in a location toward one side of the center of the sheet-bundle 8. The sheet-bundles 8, banded at the sided location, are turned by 180 degrees for, for example, every other sheet-bundle, or every other two sheet-bundles, alternately by a turn table 9 of the following process. As one result, a bundle of sheets is banded with a band 9a at one location to the right side and another bundle of sheets adjacent thereto is banded with another band 9a at a location to the left side.

As a result, when the bundles 8 of sheets have been piled up by a predetermined number, the bands 9a are equally arranged with respect to the right and to the left, and a central portion of each block 11 of the sheet-bundles 8 is not as bulky as in the case where each bundle of sheets is banded at a central portion thereof.

The bundles of sheets 8 thus banded are taken onto sheet-bundle piling lanes 10 in sequential order of serial numbers in order to form blocks 11 of piled bundles of sheets arranged in the sequential order of from 1 to 1000. The blocks 11 of the piled sheet-bundles 8 are then banded in the vertical direction in the following vertical banding process with banding devices 12 and 13 in order to form blocks 14 of pi led sheet-bundles 8 ready to be delivered.

The number of the sheets for each sheet-bundle 8 and the number of the piled sheet-bundles 8 for each block can be increased or decreased according to necessity.

Each of the sheet-bundle piling lanes 10 comprises an upper-stage sheet-bundle pooling mechanism 20 disposed on an upper-stage side thereof, and a lower-stage sheet-bundle block pooling mechanism 30 disposed immediately under the pooling mechanism 20.

The upper-stage sheet-bundle pooling mechanism 20 has a pair of sheet-bundle pooling tables 21 which are opened and closed between a support position for supporting a group of the bundles 8 of sheets and a release position for releasing the support. The tables 21 extend in parallel relation with each other the adapted to permit the dropping of the group of the sheet-bundles 8 when released. A pair of regulating plates 22 are disposed along the pooling tables 21 in the longitudinal direction thereof are adapted to regulate the sides of the sheet-bundles 8. The pooling mechanism 20 further has a fluid pressure cylinder (hydraulic cylinder) 23 adapted to open and close the sheet-bundle pooling tables 21 between the above-mentioned support and release positions. A piston rod 24 of each of the cylinders 23 and each sheet-bundle pooling table 21 are connected with each other through a connecting lever 25, so that the connecting lever 25 can be actuated in accordance with activation of the cylinder 23 in order to open and close the sheet-bundle pooling tables 21.

The pooling mechanism 20 comprises an upper transfer means for transferring the bundles of sheets 8 fed from a feed lane 43, as will be described onto a plurality of upper pooling stations formed on an upper surface sheet pooling table 21 in an orderly manner. This transfer means comprises pushers 26 for pushing the bundles 8 of sheets onto respective predetermined upper pooling stations, an endless driving member 27 formed of an endless chain, etc. on which the pushers 26 are mounted at predetermined spaces, a driving wheel 28 and a driven wheel 29 the endless driving member 27 being trained over the wheels 28 and 29.

The endless driving member 27 and the pushers 26 are operated to travel intermittently between the sheet-bundle pooling tables 21, which are opened and closed with respect to each other, and in parallel relation with the tables 21. A space or distance between the adjacent pushers 26 is set in such a manner as to correspond to the one having the maximum dimension among the bundles sheets of 8, and a number of upper pooling stations are formed between the adjacent pushers 26. In other words, each of the upper pooling stations is defined by each pusher 26, the regulating plates 22, and the pooling tables 21.

The lower-stage sheet-bundle block pooling mechanism 30 comprises a pair of sheet-bundle block pooling tables 31 extending in parallel relation under the sheet-bundle pooling tables 21, a pair of regulating plates 32 extending in the vertical direction along both sides (outer sides) of the pooling tables 31, and adapted to regulate both side surfaces of the piled blocks 11, and a device 33 for moving the pooling table 31 upwardly and downwardly along the regulating plates 32.

The lower-stage sheet-bundle block pooling mechanism 30 further comprises a lower transfer means for transferring the piled blocks 11 from a plurality of lower pooling stations formed on the upper surfaces of the pooling tables 31 onto a discharging lane 47. This transfer means comprises pushers 34 having the functions of regulating rear end faces of the piled blocks 11 and transferring the blocks 11 to another location, are operated to travel intermittently, an endless driving member 35 having the pushers 34 mounted thereon at predetermined spaces, a driving wheel 36 and a driven wheel 37 with the endless driving member 35 trained over the wheels 36 and 37.

The endless driving member 35 and the pushers 34 travel along a central portion of the pooling tables 31 in such a manner as to be in parallel relation with the tables 31, and a plurality of lower pooling stations are formed between the adjacent pushers 34. In other words, the lower pooling stations are defined by the pushers 34, the regulating plates 32, and the pooling tables 31. The upper pushers 26 and the lower pushers 34 are arranged at equal distances with respect each other, and therefore the upper and lower pooling stations are also the same in number. The upper and lower stations are in vertically corresponding relation when the sheet bundles 8 are dropped from the pooling stations of the upper-stage sheet-bundle pooling mechanism 20 to the pooling stations of the lower-stage sheet-bundle block pooling mechanism 30. Likewise, the upper and lower pushers 26 and 34 are kept in the position where they are in vertically corresponding relation when the group of the sheet-bundles 8 are dropped.

After a first operation of dropping the group of the bundles of sheets 8 is finished, the upper pushers 26 are intermittently moved in association with an action of feeding the next bundles of sheets 8 from the feed lane 43 in order to transfer the bundles of sheets onto the respective upper pooling stations. After the bundles of sheets have been transferred onto the respective upper poolings stations, the upper pushers 26 start a second operation for dropping the groups of the bundles of sheets. On the other hand, when a predetermined number of bundles 8 of sheets are dropped on to the lower pooling stations to complete the formation of the piled blocks 11, the lower pushers 34 are traveled to transfer the respective piled blocks 11 onto the discharging lane 47.

A required number of such constructed sheet-bundle piling lanes 10 are arranged at right angles with respect to the sheet-bundle feed lane 43, as will be described.

The numeral 43 denotes a sheet-bundle feed lane for forming a group of bundles of sheets bearing serial numbers into one group and transferring a plurality of such groups in a consecutive manner. A sheet-bundle 8 take-in lane 44, extending colinearly with the sheet-bundle pooling tables 21 of the upper-stage sheet-bundle pooling mechanism 20 is disposed between the feed lane 43 and the respective sheet-bundle piling lanes 10, i.e., at an introducing portion of each lane 10.

This take-in lane 44 is provided with pushers 45. A space or distance between the adjacent pushers 45 is set such that it is equal to the space or distance between the adjacent pushers 26. The take-in lane 44 is moved with the pushers 26 and 45 placed on a coaxis thereof.

The numeral 46 denotes a sheet-bundle take-in lever for intermittently taking sheet-bundles 8 on the sheet-bundle feed lane 43 onto the sheet-bundle piling lane 10 through each take-in lane 44. The sheet-bundle take-in lever 46 is arranged at a communicating portion between the sheet-bundle feed lane 43 and the sheet-bundle piling lane 10 (in other words, at a communicating portion between the sheet-bundle take-in lane 44 and the sheet-bundle feed lane 43).

The numeral 47 denotes a common discharge lane disposed on the discharging side of the lower-stage bundle block pooling mechanism 30, and is adapted to transfer the sheet-bundle blocks 11 to the next process. This discharge lane 47 is provided with pushers 48 for transferring the sheet-bundle blocks 11 along the lane.

The sheet-bundles 8, cut in accordance with the surface treatment from the large-sized sheet-blocks 1' are consecutively transferred at predetermined spaces or distances by the pushers 49, which are disposed at the sheet-bundle feed lane 43, in the sequential order of the serial number group. The sheet-bundles of the same serial number group in this sheet-bundle group, which are being transferred, are taken one by one onto the sheet-bundle take-in lane 44 by means of the reciprocal motion of the take-in lever 46 shown in FIG. 3, and taken onto the table 21 of the upper-stage bundle pooling mechanism 20, which forms the sheet-bundle piling lane 10, through the sheet-bundle take-in lane 44 such that they are linearly arranged.

Figure 2:
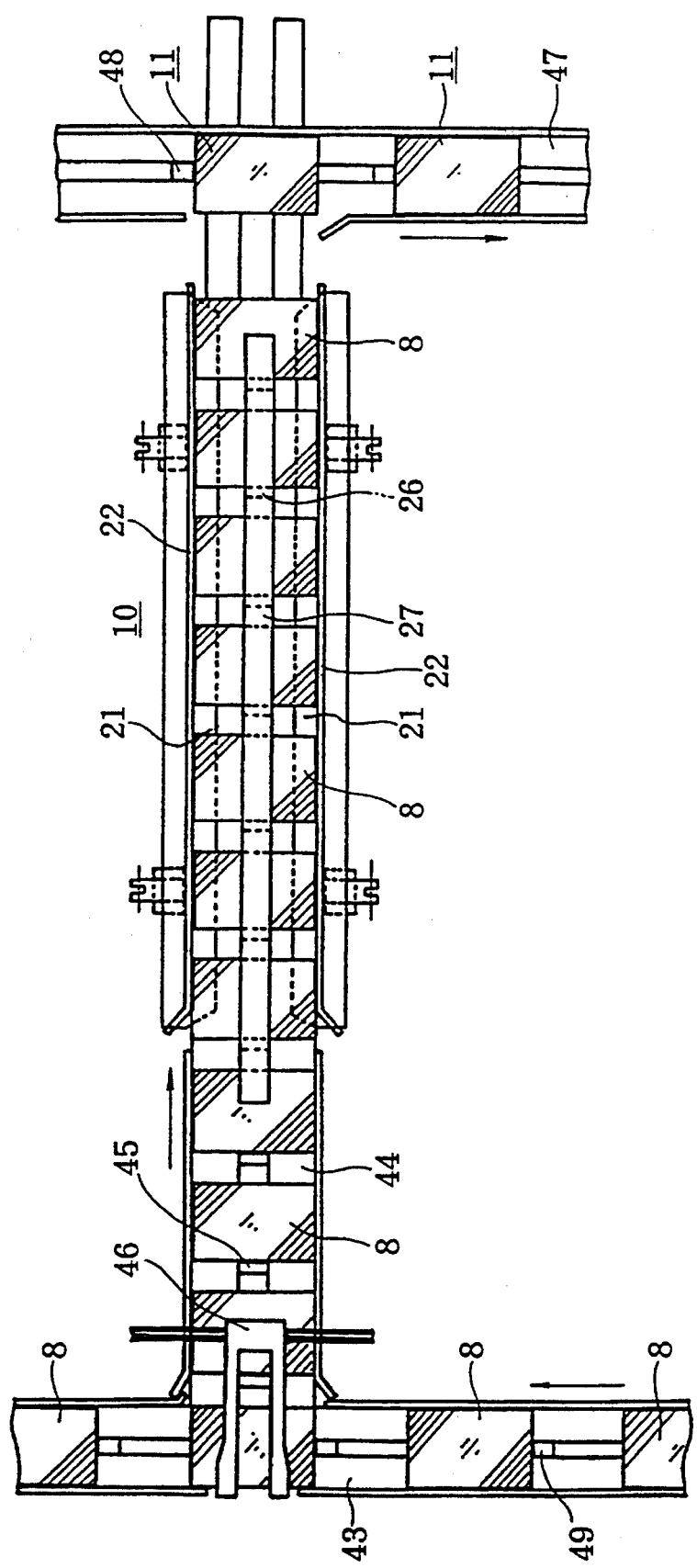
FIG. 2 is a plan view showing a single lane of a device for piling bundles of sheets according to the present invention.
Figure 5:
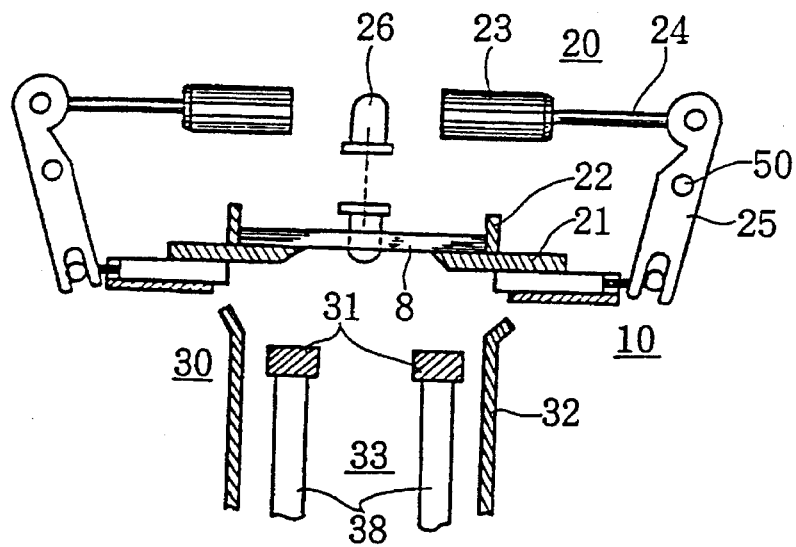
FIG. 5 is a front view of an important portion of the sheet-bundle piling device of the present invention and an explanatory view for explaining the action thereof.

In this upper-stage sheet-bundle pooling mechanism 20, the sheet-bundles 8 are supported or carried on the plurality of pooling stations (see FIGS. 2, 3 and 5) of the sheet-bundle pooling tables 21, which are in a closed state. When the sheet-bundles 8 have been supported or carried on all of the pooling stations, the pooling tables 21 are opened to permit the bundles 8 of sheets to drop. When the sheet-bundles 8 have been dropped, the sheet-bundle pooling tables 21 are closed again in order to support or carry thereon the bundles 8 of sheets bearing the next following serial number.

The sheet-bundle pooling tables 21 are opened and closed at a predetermined time interval by the cylinder piston 24 which is expanded and contracted to cause the lever 25 to be pivoted about a fulcrum 50.

Figure 3:
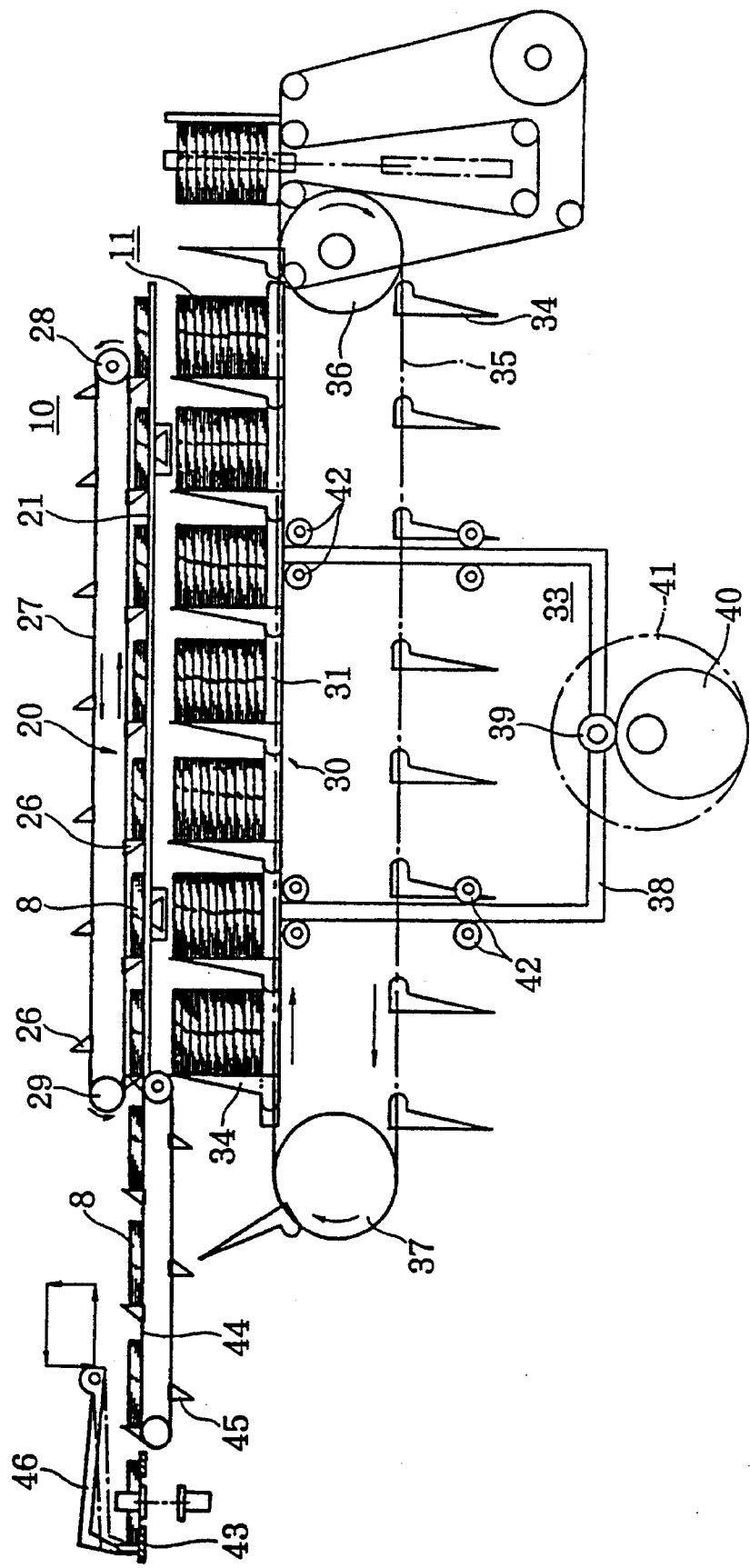
FIG. 3 is a side view of the above device.
Figure 4:
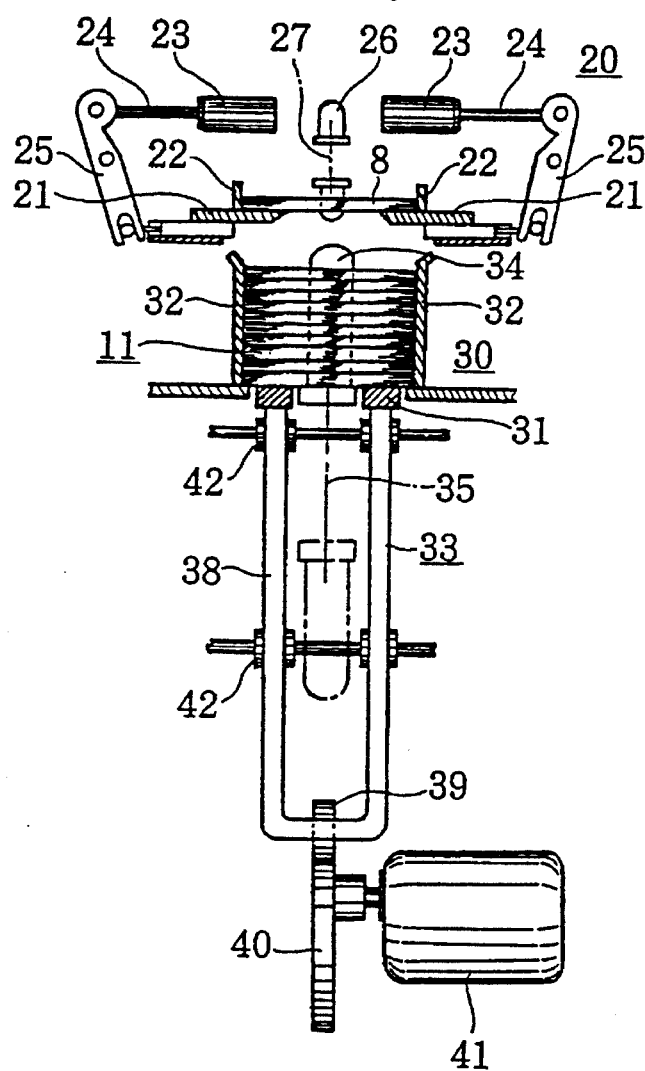
FIG. 4 is a front view of the above device.
Figure 6:
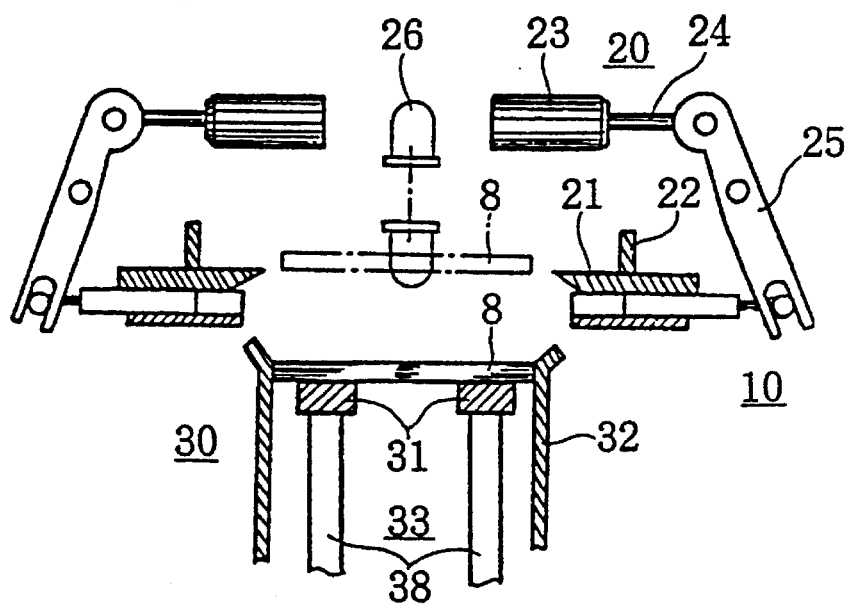
FIG. 6 is likewise a front view of an important portion of the sheet-bundle piling device of the present invention and an explanatory view for explaining the action thereof.
Figure 7:
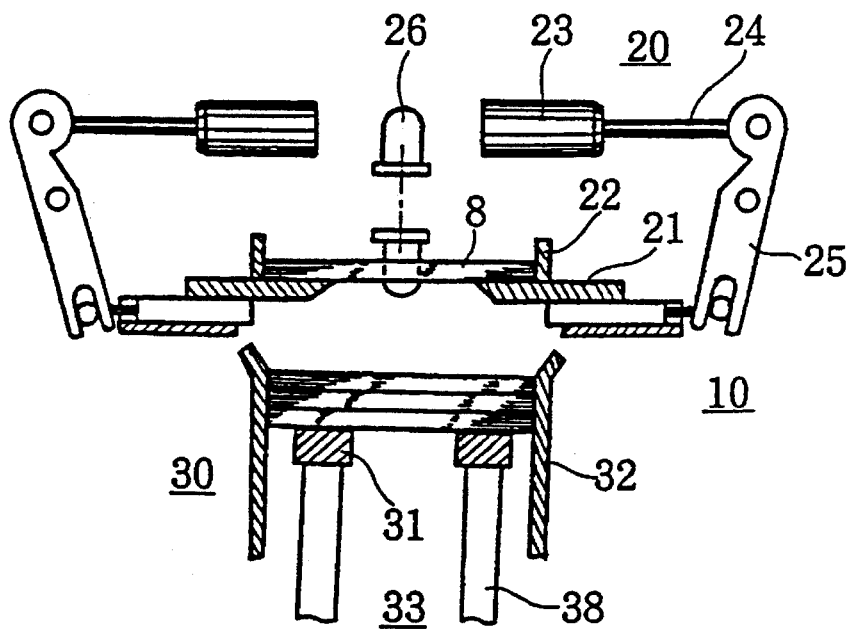
FIG. 7 is likewise a front view of an important portion of the sheet-bundle piling device of the present invention and an explanatory view for explaining the action thereof.

The bundles of sheets 8 thus dropped are pooled on pooling stations (see FIGS. 3 and 6) on the sheet-bundle block pooling tables 31 forming the lower-stage sheet-bundle block pooling mechanism 30, which is disposed right under the tables 21, and the following sheet-bundles 8 are dropped on the tops of the sheet-bundles 8 thus pooled (see FIGS. 3 and 7).

In this way, the sheet-bundles 8 are dropped one after another to form the sheet-bundle blocks 11, each bearing serial numbers of a predetermined number of sheet-bundles. In this case, the sheet-bundle block pooling tables 31 are lowered by an elevator mechanism 33 in such a manner as to correspond to the piling quantity of the sheet-bundles so as to be ready for pooling the following sheet-bundles.

Specifically, when a cam wheel 40 is rotated, step by step, through a predetermined rotary angle by a motor 41, a rotor 39 is guided by this cam wheel 40 to raise or lower, step by step, a lifting rod 38 in order to raise or lower the sheet-bundle block pooling tables 31, normally to a level suitable for loading the blocks.

In case 10 bundles of sheets are piled up, as shown in FIG. 3, the sheet-bundle blocks 11 bear serial numbers of from 1 to 1000. The sheet-bundle blocks 11 thus formed are discharged onto the common discharge lane 47 by a discharge mechanism.

According to the present invention, bundles of sheets, which are stacked in a serial order as in, for example, banknotes, lottery tickets, post cards, while being transferred by the feed lane, can be taken onto the sheet-bundle piling lanes which are disposed in parallel relation with respect to the feed lane, in order to simultaneously and consecutively form a number of blocks of bundles of sheets stacked in a serial order.

In other words, the present invention can very effectively and economically pursue the work of piling up a required number of bundles of sheets, and is capable of surely solving the afore-mentioned problems inherent in the conventional drum system.

What is claimed is:
1. A device for piling bundles of sheets, comprising:

a plurality of sheet bundle piling lanes adapted to pile up a predetermined number of bundles of sheets, each said sheet bundle piling lane comprising an upper stage and a lower stage, said upper stage comprising an upper sheet bundle pooling mechanism and said lower stage comprising a lower sheet bundle pooling mechanism immediately below said upper sheet bundle pooling mechanism;

said upper sheet bundle pooling mechanism comprising a pair of sheet bundle pooling tables spaced apart in a direction having a plurality of predetermined sheet bundle pooling stations located along said tables in a direction normal to the direction in which said tables are spaced apart, wherein said pair of spaced apart tables have regulating plates thereon and fluid pressure cylinders connected thereto for opening and closing said tables between a support position for supporting sheet bundles at said pooling stations and a release position for releasing the sheet bundles from the support position and permitting the sheet bundles to drop, and a plurality of pushers adapted to push sheet bundles into said sheet bundle pooling stations of said sheet bundle pooling table, wherein said pushers of said upper sheet bundle pooling mechanism are mounted on an endless driving member above said sheet bundle pooling tables;

said lower sheet bundle pooling mechanism comprising sheet bundle block pooling tables disposed so as to be upwardly and downwardly moveable, said sheet bundle block pooling tables comprising a pair of tables spaced apart and extending parallel with respect to each other, a plurality of predetermined block pooling stations spaced along said sheet bundle block pooling table adapted to receive and pile up into blocks sheet bundles dropped from said upper sheet bundle pooling mechanism at said predetermined pooling stations of said sheet bundle block pooling tables, a plurality of pushers adapted to discharge the blocks of sheet bundles from said sheet bundle block pooling tables after a predetermined number of sheet bundles is accumulated, wherein said pushers of said lower sheet bundle pooling mechanism are mounted on an endless driving member and extend up through said sheet bundle block pooling table, and a device for moving said sheet bundle block pooling table up and down between a lower position in which said sheet bundle block pooling table is flush with said endless driving member and an upper position in which said sheet bundle block pooling table is above said endless driving member.

2. A sheet bundle piling lane, comprising:

an upper stage and a lower stage, said upper stage comprising an upper sheet bundle pooling mechanism and said lower stage comprising a lower sheet bundle pooling mechanism immediately below said upper sheet bundle pooling mechanism;

said upper sheet bundle pooling mechanism comprising a pair of spaced apart sheet bundle pooling tables having a plurality of predetermined sheet bundle pooling stations located along said tables in a direction normal to the direction in which said tables are spaced apart, wherein said pair of spaced apart tables have regulating plates thereon and fluid pressure cylinders connected thereto for opening and closing said tables between a support position for supporting sheet bundles at said pooling stations and a release position for releasing the sheet bundles from the tables and permitting the sheet bundles to drop, and a plurality of pushers adapted to push sheet bundles into said sheet bundle pooling stations of said sheet bundle pooling tables, wherein said pushers of said upper sheet bundle pooling mechanism are mounted on an endless driving member above said sheet bundle pooling tables;

said lower sheet bundle piling mechanism comprising sheet bundle block pooling tables disposed so as to be upwardly and downwardly moveable, said sheet bundle block pooling tables comprising a pair of tables spaced apart and extending parallel with respect to each other, a plurality of predetermined block pooling stations on said sheet bundle block pooling tables adapted to receive and pile up into blocks sheet bundles dropped from said upper sheet bundle piling mechanism at said predetermined pooling stations of said sheet bundle block pooling tables, a plurality of pushers adapted to discharge the blocks of sheet bundles from said sheet bundle block pooling tables after a predetermined number of sheet bundles is accumulated, wherein said pushers of said lower sheet bundle piling mechanism are mounted on an endless driving member and extend up through said sheet bundle block pooling tables, and a device for moving said sheet bundle block pooling tables up and down between a lower position in which said sheet bundle block pooling tables are flush with said endless driving member and an upper position in which said sheet bundle block pooling tables are above said endless driving member.

\* \* \* \* \*